HOUSING FOR UNDERGROUND DISTRIBUTION APPARATUS
Filed Dec. 23, 1963 3 Sheets-Sheet 1
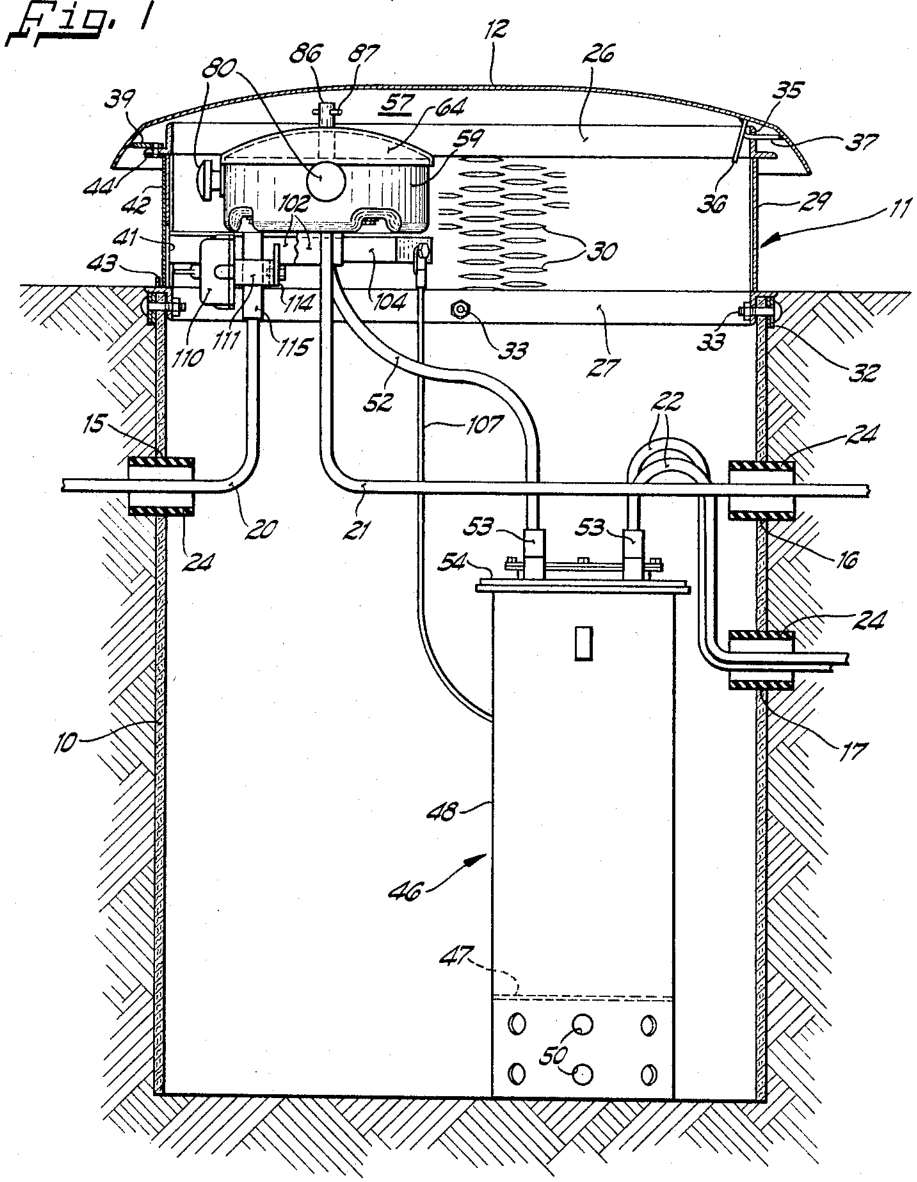
INVENTORS.
RICHARD J. LANG
MIKE P. CRIVELLO
RONALD J. BERTLING
BY Lee H Kaiser
ATTORNEY HOUSING FOR UNDERGROUND DISTRIBUTION APPARATUS
Filed Dec. 23, 1963 3 Sheets-Sheet 2
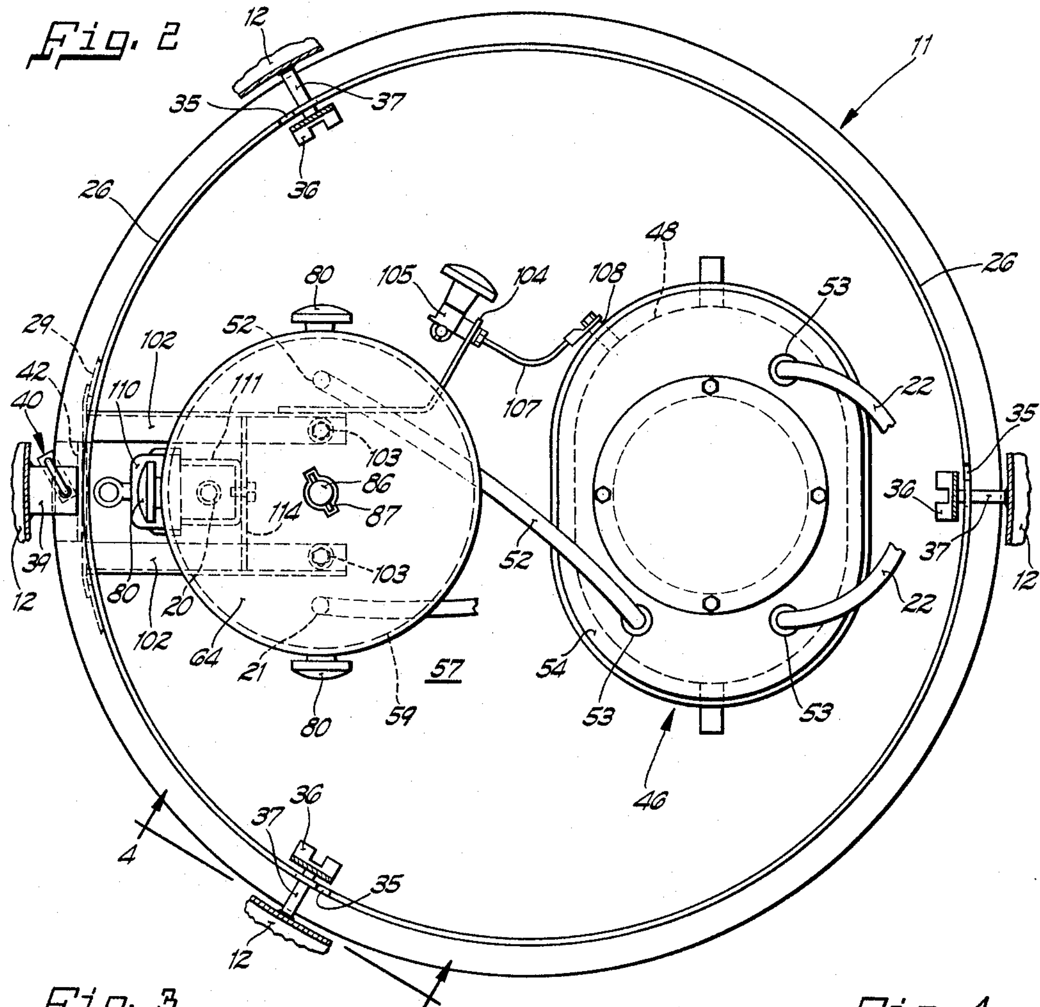
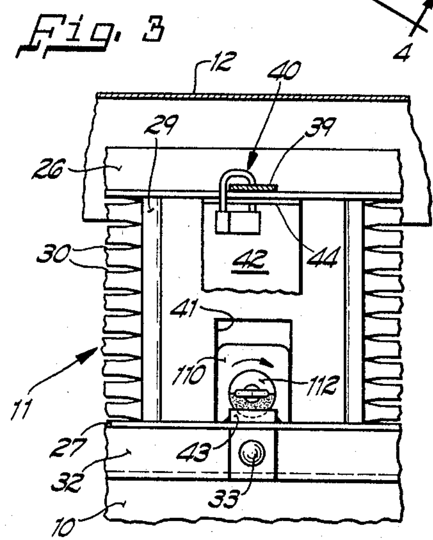
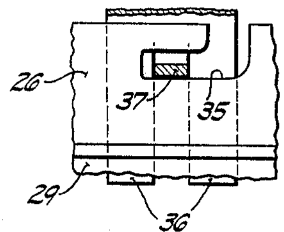
INVENTORS.
RICHARD J. LANG
MIKE P. CRIVELLO
RONALD J. BERTLING
BY Lee H. Kaiser
ATTORNEY Nov. 22, 1966 R. J. LANG ETAL 3,287,566
HOUSING FOR UNDERGROUND DISTRIBUTION APPARATUS
Filed Dec. 23, 1963 3 Sheets-Sheet 3
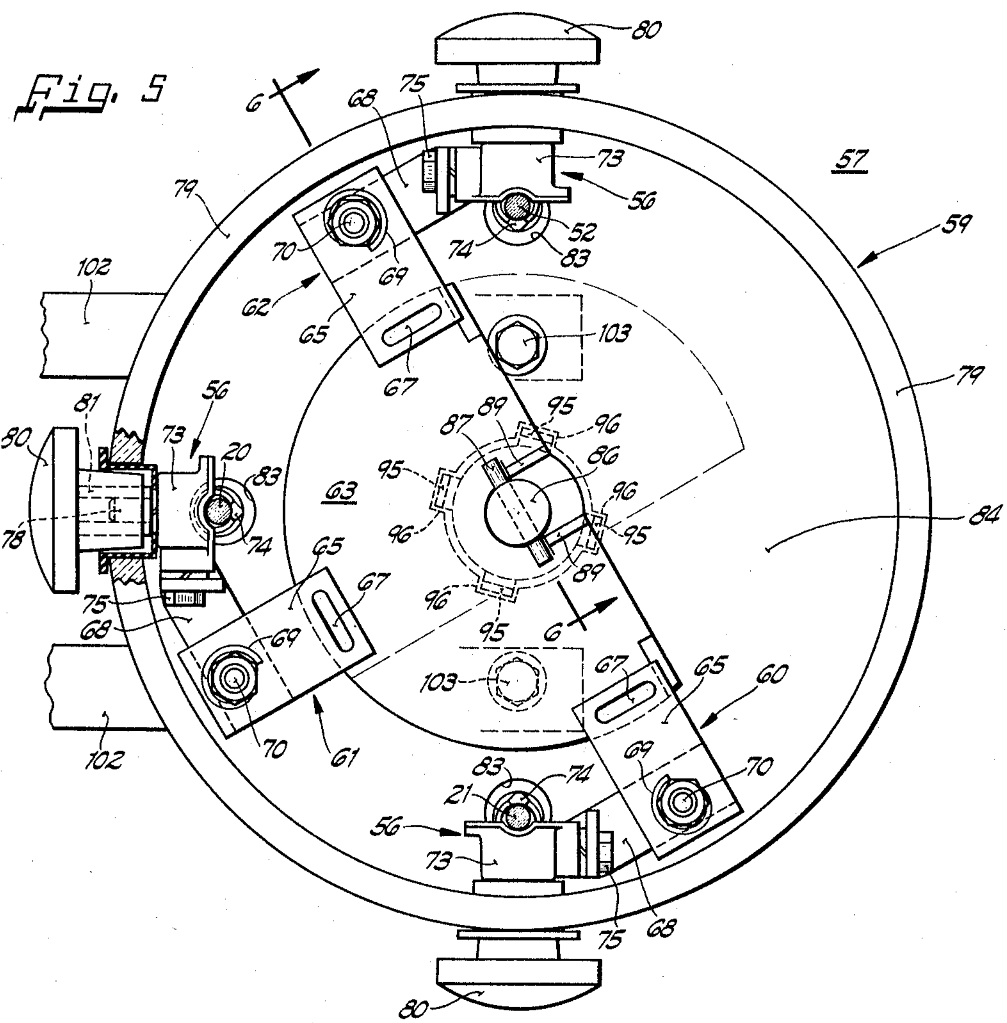
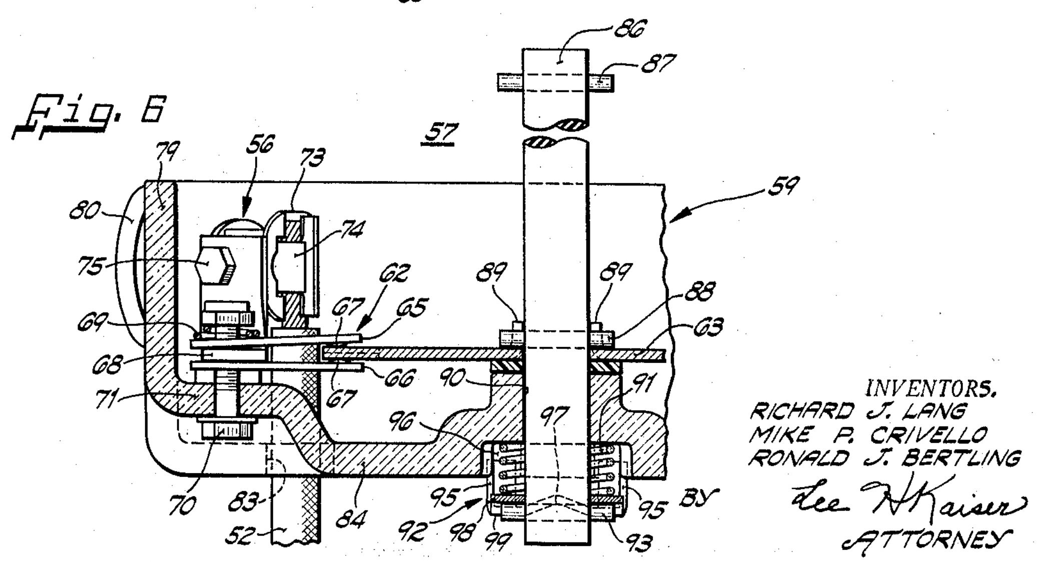
INVENTORS.
RICHARD J. LANG
MIKE P. CRIVELLO
RONALD J. BERTLING
BY Lee H Kaiser
ATTORNEY United States Patent Office 3,287,566

Patented Nov. 22, 1966

3,287,566
HOUSING FOR UNDERGROUND DISTRIBUTION APPARATUS

Richard J. Lang, Cleveland, Ohio, and Mike P. Crivello, St. Francis, and Ronald J. Bertling, Grafton, Wis., assignors to McGraw-Edison Company, Milwaukee, Wis., a corporation of Delaware Filed Dec. 23, 1963, Ser. No. 332,811
9 Claims. (Cl. 307—17)

This invention relates to housings for electrical apparatus and, in particular, to vault construction for electrical apparatus used in underground distribution systems.

Overhead electrical distribution systems are aesthetically displeasing and detract from the beauty of residential areas, and in an attempt to improve the aesthetic appearance of distribution systems, electric utilities have installed buried cable with distribution transformers enclosed within metallic housings supported on concrete pads at ground level. Completely underground power distribution systems with concrete vaults are also used in the commercial and more built-up portions of cities having heavy transformers and a multiplicity of service connections to buildings. Although an underground system minimizes the problem of wind, ice, and tree limb damage and reduces the likelihood of lightning damage, the high cost of an underground system in comparison to overhead has discouraged more widespread adoption of underground distribution systems for residential service, particularly because the consumer must pay the difference in cost. The metallic housings for distribution transformers supported on concrete pads at ground level are expensive and time consuming to construct, particularly in that they require forms for the concrete pad and inherently involve delay while the poured concrete sets, and are also difficult to camouflage so they do not detract from the appearance of the residential area. Further, such underground distribution systems for residential areas conventionally utilize expensive primary cable of the jacketed or sheathed type and have potheads or other relatively expensive stress grading terminations for the high voltage cable.

It is an object of the invention to provide a semi-buried vault construction for electrical distribution system apparatus which protrudes considerably less distance above ground and is more aesthetically appealing and easier to camouflage than known metallic electrical apparatus housings supported at ground level on concrete pads. It is a further object of the invention to provide such a semi-buried vault construction which permits a substantial reduction in the cost of an underground distribution systems and is simple to assemble and easy to ship in comparison to prior art constructions.

It is a still further object to provide such a semi-buried vault construction having an inexpensive and relatively small sectionalizing switch for isolating a fault on a loop feed distribution system. An object of one embodiment of the invention is to provide an aesthetically pleasing, semi-buried housing arrangement for a low voltage, buried distribution system which obviates the necessity of insulating bushings on the distribution transformer, the expensive jacketed primary cable, and the expensive and difficult-to-construct stress grading terminations for the primary cable.

These and other objects and advantages of the invention will be more readily apparent from the following detailed description when taken in conjunction with the accompanying drawing wherein:

FIG. 1 is a vertical section view taken through a semi-buried vault construction embodying the invention;

FIG. 2 is a plan view of the vault construction of FIG. 1 with the vault cover removed;

FIG. 3 is a partial elevation view of the vault construction of FIG. 1 with a portion of the inspection door and the vault cover broken away;

FIG. 4 is a view taken on line 4—4 of FIG. 2;

FIG. 5 is a plan view of the sectionalizing switch shown in FIG. 1 with the switch cover removed; and FIG. 6 is a view taken on line 6—6 of FIG. 5.

A semi-buried vault construction embodying the invention is illustrated in the drawing for an underground distribution system of relatively low voltage, e.g., 2400 volts, for residental service and includes a tubular vault, or base 10 buried in the earth, a tubular sidewall section 11 secured to the upper end of vault 10 at ground level, and a removable dome cover 12. Vault 10 is an open-ended cylinder which typically is approximately three feet in diameter and is preferably constructed of bituminized fiber, for example, spirally wound fiber impregnated with coal tar pitch. The bituminized fiber base 10 is low in cost, mechanically strong in contrast to the brittleness of concrete, relatively light in weight and easy to ship, inert to all types of soil, provides maximum resistance to compressive forces, and has exceptionally long life. The bituminized fiber is non-conductive; immune to electrolysis, corrosion and erosion; is not affected by alkali, acid or other deteriorating ground conditions; and is not attacked by vegetable growth or tree roots. The tubular vault 10 has high compressive strength resisting crushing forces transverse to the axis thereof tending to flatten it. Installation of bituminized fiber vault 10 is greatly simplified in comparison to distribution systems utilizing concrete pads or "kiosks" since no concrete pouring forms are required, no time delay is involved while the poured concrete sets, and the vault 10 can be installed in a cylindrical hole bored in the soil by an earth auger which is standard equipment for electric utilities. The coal tar pitch impregnated vault 10 is readily adapted in the field to any array of underground cable and residence loads since apertures 15, 16 and 17 can easily be drilled in the field at the most advantageous position in circumferential and axial directions for an incoming underground primary cable 20 and an outgoing underground primary cable 21 of a loop feed and also for underground secondary cables 22 to the residential load. Conduits 24 of bituminized fiber pipe for the primary and secondary cables 20, 21, and 22 may be driven into the apertures 15, 16, and 17 in vault 10.

Sidewall section 11 has the configuration of an open-ended cylinder and is secured to the upper end of base 10 at ground level. Sidewall section 11 includes circular angle iron support members 26 and 27 at its upper and lower ends respectively connected by suitable means such as welding to a tubular, metallic, expanded metal member 29 provided with louvers 30 around most of the circumference thereof to facilitate cooling of electrical apparatus housed within the semi-buried vault. The horizontally disposed leg of the lower angle iron support member 27 rests upon the upper edge of base 10. Arcuate clamping members 32 are disposed in circumferentially spaced apart relation against the outer periphery of base 10 adjacent the upper end thereof, and bolts 33 extending through clearance apertures in the arcuate clamping members 32, the base 10, and the depending leg of lower angle support 27 rigidly affix the sidewall section 11 to the upper end of base 10.

Upper angle support 26 has a plurality of circumferentially spaced apart bayonet-shaped slots 35 (see FIG. 4). Removable dome-shaped cover 12 has a plurality of inwardly inclined guide fingers 36 welded to the bottom surface thereof which fit within circular upper angle support 26 and direct the cover 12 to its final position. Each guide finger 36 has a horizontally extending locking portion 37 which fits within a bayonet slot 35 and locks the cover 12 to sidewall section 11 when cover 12 is rotated. Removable cover 12 gives free access to components such as the sectionalizing switch and the distribution transformer within the semi-buried housing. A horizontally extending locking member 39 welded to the bottom surface of cover 12 has a padlock receiving aperture which registers with a padlock receiving aperture in the upper angle support 26 to prevent rotation of cover 12 relative to sidewall section 11, and thus prevent removal of locking finger portions 37 from the bayonet slots 35, when a padlock 40 (see FIGS. 2 and 3) is inserted through the padlock receiving apertures. An opening 41 in sidewall member 29 permitting inspection of and access to the fault current indicator and to the interior of the vault is normally closed by an inspection door 42. The lower end of door 42 is disposed behind an upstanding lug 43 on lower support member 27, and a horizontally extending portion 44 on the upper end of inspection door 42 has a padlock receiving aperture which registers with the padlock receiving apertures in locking member 39 and in upper support member 26 to permit locking the inspection door 42 and vault cover 12 closed with the same padlock.

Base 10 may enclose a submersible type distribution transformer 46 below ground level which rests upon the soil at the bottom of the hole drilled in the earth to receive base 10. The bottom casing wall 47 of transformer 46 is positioned approximately six inches above the lower edge of the transformer casing sidewall 48, and the portion of the casing sidewall 48 below bottom wall 47 is provided with a plurality of apertures 50. Such construction permits accumulation of water and debris to a depth of at least six inches within the vault before the thermal characteristics of transformer 46 are affected. The casing of transformer 46 is preferably of $\frac{3}{16}$ inch thick steel and is coated with a suitable corrosion resistant bitumastic compound with which subway transformers are conventionally coated to provide maximum resistance against rust and corrosion.

Porcelain primary and secondary insulating bushings are omitted from distribution transformer 46. A transformer primary tap cable 52 having a covering of suitable moisture resistant insulation such as butyl rubber or polyethylene is connected at one end within the transformer casing to the transformer primary winding (not shown) and protrudes through a compression type fitting 53 on transformer cover 54 having suitable resilient gasket or other sealing means for preventing entrance of moisture into the transformer casing. The other end of the transformer primary winding is connected by means not shown to the grounded casing of transformer 46. The other end of primary tap cable 52 is affixed to an eyebolt connector 56 (see FIG. 5) on a primary sectionalizing switch 57 mounted within the semi-buried vault above ground level. The transformer low voltage cables 22 are connected to the transformer secondary winding (not shown) within the transformer casing and protrude through compression type fittings 53 on transformer cover 54 having resilient sealing means for preventing entrance of moisture into the transformer casing and extend through aperture 17 from whence they run in underground trenches (not shown) to residences supplied by distribution transformer 46.

Sectionalizing switch 57 is mounted above ground level so that it is unaffected by rain water, since even if the semi-buried vault became completely flooded, the water above ground level will run out of the louvers 30. Sectionalizing switch 57 includes a cylindrical procelain housing 59 enclosing three stationary contacts 60, 61, and 62 (see FIG. 5) spaced ninety degrees apart in a circle and a semicircular movable metallic contact 63 adapted to engage the stationary contacts 60, 61 and 62 and being visible through a transparent plastic cover 64 for switch 57 when the vault cover 12 is removed so that the position of the switch 57 may be visually observed. Stationary contacts 62 and 60 are diametrically opposed and respectively connected to the tap cable 52 leading to the primary winding and to the outgoing primary cable 21, and the stationary contact 61 is connected to the incoming primary underground cable 20 so that the incoming and outgoing cables 20 and 21 and the tap cable 52 to the primary winding are electrically interconnected when the movable contact 63 is in the position shown in full lines in FIG. 5 and so that the incoming primary underground cable 20 may be connected to the transformer primary winding and the outgoing cable 21 disconnected therefrom when the movable contact 63 electrically engages only stationary contacts 61 and 62 as shown in dotted lines in FIG. 5. In a similar manner, the incoming cable 20 may be disconnected and the transformer primary winding connected only to outgoing primary cable 21 when the movable contact 63 engages stationary contacts 60 and 62 only (not shown), or the transformer primary winding can be disconnected and the incoming primary cable 20 connected only to the outgoing primary cable 21 when the movable contact 63 engages stationary contacts 61 and 60 only.

Each stationary contact 60, 61 and 62 includes a pair of superimposed contact fingers 65 and 66 of high conductivity metal such as copper preferably plated with silver and having embossings 67 therein providing contact button portions and being spaced sufficiently far apart by a connecting member 68 (see FIG. 6) to receive the movable contact 63 therebetween and being urged into high pressure contact with opposite sides of movable contact 63 by a compression spring 69 encircling a mounting bolt 70. Porcelain switch body 59 has three raised portions 71 (see FIG. 6) spaced ninety degrees apart on which the stationary contacts 60, 61 and 62 are mounted. Mounting bolts 70 extend through registering apertures in the raised portion 71 of porcelain housing 59, lower contact finger 66, connecting member 68, upper contact finger 65, and compression spring 69, and a nut threaded on the end of mounting bolt 70 compresses spring 69 to resiliently urge the contact fingers 65 and 66 toward each other and also affixes the stationary contact to the porcelain body 59. Connecting member 68 is of high conductivity metallic material such as copper plated with silver and has a right angle band therein and electrically connects the stationary contact fingers 65 and 66 to the body portion 73 of one of the eyebolt connectors 56. Body portion 73 of eyebolt connector 56 is mounted on the upwardly extending portion of connecting member 68 by bolt means 75. Eyebolt 74 of connector 56 has a threaded shank 78 which extends through an aperture in the sidewall 79 of porcelain switch body 59 and is actuated by a large handknob 80 of suitable insulating material having an internally threaded metallic insert 81 molded therein engaging the externally threaded shank 78. Porcelain switch body 59 has apertures 83 in the bottom wall 84 thereof for the incoming and outgoing cables 20 and 21 and the transformer tap cable 52, and the bare ends of the conductors of cables 20, 21 and 52 are clamped within porcelain switch body 59 between the headed portions of the eyebolts 74 and the body portions 73 of the connectors 56 associated with the stationary contacts 61, 60 and 62 respectively. It will be appreciated that the primary cables 20, 21 and 52 can be disconnected, without removing cover 64, by turning the large insulated hand knobs 80 on the exterior of porcelain housing 59, thus allowing ease of cable connection even when rubber gloves are worn by the lineman.

Movable switch contact 63 is preferably of high conductivity metallic material such as copper plated with silver and is rotatable with an actuating shaft 86 of suitable insulating material such as fiberglass impregnated with an insulating resin such as a polyester resin. Shaft 86 extends through an axial aperture in transparent switch cover 64 and has a transverse actuating pin 87 through its upper end which permits the switch to be actuated by a portable, removable operating handle (not shown) of insulating material. A driving connection between actuating shaft 86 and movable contact 63 is provided by a transverse pin 88 through shaft 86 directly above movable contact 63 (see FIG. 6). Pin 88 abuts at its ends against ear portions 89 of movable contact 63 bent upwardly on opposite sides of shaft 86.

Switch operating shaft 86 is spring loaded to provide snap action when the movable contact 63 is actuated between switch positions. Operating shaft 86 extends through an axial aperture 90 in the bottom wall 84 of porcelain switch housing 59 and through a compression spring 91 and axial opening in a spider 92. A transverse pin 93 extends through the lower end of operating shaft 86 below spider 92. Spider 92 has a plurality of upwardly extending, circumferentially spaced apart legs 95 which fit within radially extending grooves 96 in the bottom surface of porcelain switch housing 59 to prevent rotation of spider 92. Spider 92 also has two diametrically extending grooves 97 and 98 at right angles to each other and with raised portions 99 therebetween. Spring 91 is compressed between the bottom wall 84 of porcelain switch housing 59 and the spider 92 and actuates spider 92 into engagement with transverse pin 93 so that pin 93 is urged into one of the diametral grooves 97 and 98.

When the operating handle is engaged with pin 88 and actuating shaft 86 is rotated, the pin 93 below the switch housing 59 moves spider 92 in an upward direction and further compresses spring 91 as pin 93 departs from one of the diametral grooves 97 or 98, and the force of spring 91 urging pin 93 across the raised portion 99 between the diametral grooves 97 and 98 and into the succeeding diametral groove snaps the movable contact 63 to the succeeding switch position.

Porcelain switch housing 59 is supported on a pair of angle support brackets 102 welded at their ends to and extending in parallel relation generally radially inward from sidewall member 29. Bolts 103 (see FIG. 2) extending through apertures in the bottom wall 84 of porcelain switch housing 59 and through the horizontally disposed leg of each angle bracket 102 rigidly secure switch 59 to the angle brackets 102 and to the sidewall section 11. A metallic ground bus 104 affixed to one support bracket 102 has an eyebolt connector 105 affixed to the end thereof adapted to receive a ground conductor which may be connected to a suitable ground rod. Ground bus 104 is easily accessible for connecting other protective apparatus mounted with the vault and for grounding the primary cables to provide absolute safety for linemen when working on distribution transformer 46. A conductor 107 electrically connects the ground bus 104 to a ground lug 108 on the casing of distribution transformer 46. It will be appreciated that this arrangement furnishes a solid and continuous ground for the entire vault sidewall section 11 and cover 12 and provides complete safety to operating personnel when resetting the cable fault indicator 110 which is disposed behind inspection door 42. Cable fault indicator 110 is of the type disclosed in copending application Serial No. 87,822 of Edward L. Sankey filed February 8, 1961, now abandoned, and having the same assignee as the present invention, wherein a yoke 111 of magnetic material encircles the incoming primary cable 20. When fault current of predetermined magnitude flows in cable 20, the magnetic flux induced in yoke 111 releases a latch (not shown) which permits a spring to actuate an indicating plate 112 (see FIG. 3). Indicating plate 112 is visible through inspection door 42 to permit operating personnel to check whether a fault has occurred. When a fault occurs between successive distribution transformers in a loop, a lineman will check the fault indicators at each vault, and when a vault is located wherein the fault indicator 110 has not been released, the lineman will known that the fault occurred between such vault and the vault having the last tripped, or released, fault indicator. The magnetic yoke 111 is bolted to a cross-piece 114 welded to the support brackets 102 for the switch 57 so that the magnetic yoke 111 is grounded, and a sleeve of suitable insulating material 115 such as polyethylene is placed over the portion of the cable 20 extending through yoke 111 for the purpose of providing complete protection for operating personnel when resetting the fault indicator after it has tripped due to excessive flow of current.

The invention has been described with reference to a buried distribution system of relatively low primary voltage, e.g., 2400/4160–Y, and it will be appreciated that the disclosed construction permits elimination of the expensive and difficult-to-construct stress grading termination means, or potheads, for the primary cables as well as the expensive primary and secondary porcelain insulating bushings for the distribution transformer. The primary cables 20, 21 and 52 may be of the non-jacketed, or unsheathed, type which permits a further substantial reduction in the cost of the underground distribution system. The disclosed vault construction protrudes only approximately one foot above ground level in comparison to approximately three and one-half feet for transformer housings supported on ground level concrete pads, thus improving the aesthetic appearance of the system and making the housing easier to camouflage. The switch 57 is considerably smaller and less expensive than prior art sectionalizing devices, yet it is rated at 100 amperes, provides any desired connection between incoming and outgoing and primary tap cables, permits visual inspection of switch position, and is completely safe in that the only exposed portions of the primary cable conductor are within the porcelain body 59 of the sectionalizing switch and can be connected and disconnected by large insulating hand knobs 80 exterior of porcelain body 59, thereby permitting ease of connection when rubber gloves are worn by the lineman. The plastic switch cover 64 prevents a lineman from dropping tools upon the electrically "live" portions of the sectionalizing switch 57, and the use of operating shaft 86 of insulating material and a removable insulating handle (not shown) assures complete safety to the lineman when operating switch 57. The sectionalizing switch 57 can be operated and any primary cable physically disconnected without removing the plastic cover 64 after the switch has been installed initially, and the sectionalized switch 57 is positioned above ground level and above the lowest louvers 30 in sidewall section 11 so the installation functions properly and is electrically safe even if the vault were completely flooded with water.

While only a single embodiment of the invention has been illustrated and described, many modifications and variations thereof will be readily apparent to those skilled in the art, and consequently it is intended in the appended claims to cover all such modifications and variations which fall within the true spirit and scope of the invention.

We claim:

1. In an underground electrical distribution system for residential service, in combination, a tubular open-ended vault of bituminized fiber disposed in the earth with its axis vertical and its upper end at ground level and having conductor passage means extending therethrough, an open-ended metallic cylindrical sidewall section disposed above ground level and affixed to said vault adjacent the upper end thereof and having a plurality of louvers therein, a cover removably secured to and closing the open upper end of said sidewall section, a distribution transformer disposed within said vault below ground level and having a sealed casing enclosing a primary and a secondary winding and being provided with a peripherally continuous sidewall and a bottom wall secured to said sidewall above the lower end thereof, whereby the cooling characteristics of said transformer are not affected by debris within said vault up to the level of said bottom wall, a sectionalizing switch having three spaced apart stationary contacts and a manually operable movable contact to electrically bridge any two of said stationary contacts and also to electrically bridge all three of said stationary contacts, a primary tap cable electrically connected at one end to the first of said stationary contacts and at the other end to said primary winding within said transformer casing, means affixed to said sidewall section for mounting said switch within said sidewall section above ground level, incoming and outgoing underground primary cables extending through said conductor passage means in said vault and being electrically connected to the second and third of said switch stationary contacts respectively, and a secondary underground cable extending through said conductor passage means into the interior of said vault and being electrically connected to said secondary winding within said transformer casing.

2. In an underground electrical distribution system for residential service, in combination, a tubular open-ended vault of bituminized fiber disposed in the earth with its axis vertical and having conductor passage means extending therethrough, an open-ended metallic cylindrical sidewall above ground level affixed to said vault adjacent the upper end thereof and having a plurality of louvers therein, a cover removably secured to and closing the open upper end of said sidewall, means for padlocking said cover closed, a distribution transformer disposed within said sidewall below ground level and having a sealed casing enclosing a primary and a secondary winding, a sectionalizing switch having three spaced apart stationary contacts and a movable contact adapted to electrically bridge between any two of said stationary contacts and to also electrically bridge all three of said stationary contacts, supporting means affixed to said sidewall for mounting said switch within said sidewall above ground level, a primary tap cable electrically connected at one end to the first of said stationary contacts and extending at its other end through a first cable entrance aperture in said transformer casing and being connected to said primary winding, incoming and outgoing underground primary cables extending through said conductor passage means in said vault and being electrically connected to the second and third of said stationary contacts respectively, a secondary underground cable extending through said conductor passage means into the interior of said vault and through a second cable entrance aperture in said transformer casing and being connected to said secondary winding, and compressible means surrounding said primary tap and secondary cables for hermetically sealing said first and second cable entrance apertures.

3. In an underground electrical distribution system for residential service, in combination, an open-ended tubular vault of bituminized fiber disposed in the earth with its axis vertical and its upper end at ground level and having conductor passage means extending therethrough, an open-ended cylindrical metallic sidewall section above ground level affixed to said vault adjacent the upper end thereof and having a plurality of louvers therein and an opening permitting access to the interior of said vault, a cover removably secured to and normally closing the open upper end of said sidewall section, a door normally closing said access opening, means for padlocking said door and said cover closed, a distribution transformer disposed within said vault below ground level and having a sealed casing enclosing primary and secondary windings, a primary tap cable connected to said primary winding and extending through a cable entrance opening in said transformer casing, a secondary underground cable connected to said secondary winding and extending through a second cable entrance opening in said transformer casing and through said conductor passage means in said vault, means for hermetically sealing said first and second cable entrance apertures in said casing, a sectionalizing switch having three spaced apart stationary contacts, the first of which is connected to said primary tap cable, and a movable contact adapted to electrically bridge any two of said stationary contacts and also to bridge all three of said stationary contacts, means affixed to said sidewall section for mounting said switch within said sidewall section above ground level, incoming and outgoing underground primary cables extending through said conductor passage means in said vault and being electrically connected to said second and third stationary switch contacts respectively, means linking one of said primary cables for visually indicating the flow of fault current of predetermined magnitude in said one cable and being visible and adapted to be reset through said opening, and means for grounding said metallic sidewall section.

4. In an underground electrical distribution system for residential service, in combination, an open-ended tubular vault of bituminized fiber disposed in the earth with its axis vertical and its upper end at ground level and having conductor passage means extending therethrough, an open-ended cylindrical sidewall above ground level affixed to said vault adjacent the upper end thereof and having a plurality of louvers therein, a vault cover removably secured to and closing the open upper end of said sidewall, incoming and outgoing primary underground cables extending through said conductor passage means into said vault, a distribution transformer within said vault below ground level and having a sealed casing enclosing primary and secondary windings, a primary tap cable connected to said primary winding and extending through a first cable entrance aperture in said transformer casing, a secondary underground cable connected to said secondary winding and extending through a second cable entrance aperture in said transformer casing and through said conductor passage means in said vault, means for hermetically sealing said cable entrance apertures, a sectionalizing switch having a cylindrical porcelain housing open at its upper end and enclosing first, second and third stationary contacts spaced apart in an arc and electrically connected to said tap, incoming, and outgoing primary cables respectively and a movable contact rotatable into electrical bridging engagement with any two of said stationary contacts and also into bridging engagement with all three of said stationary contacts, a transparent switch cover closing the open end of said porcelain housing, whereby the position of said switch is visible when said vault cover is removed, each of said stationary contacts having cable conductor fastening means disposed within said porcelain housing actuated by means extending through said porcelain housing and having insulating portions only exposed exterior of said porcelain housing, and support means affixed to said sidewall for mounting said switch within said sidewall above ground level.

5. In an underground electrical distribution system for residential service, in combination, a cylindrical open-ended vault of bituminized fiber disposed in the ground with its axis vertical and its upper end at ground level and having conductor passage means therethrough, a cylindrical open-ended sidewall above ground level affixed to said vault adjacent its upper end and having a plurality of louvers and an opening therein permitting access to the interior thereof, a vault cover removably secured to and normally closing the open upper end of said sidewall, an inspection door normally closing said access opening, means for padlocking said vault cover and said inspection door closed, a distribution transformer disposed within said vault below ground level and having a sealed casing enclosing inductively linked primary and secondary windings, a secondary underground cable extending through said conductor passage means into the interior of said vault and being connected to said secondary winding, a primary underground cable extending through said conductor passage means into the interior of said vault, a primary tap cable within said vault connected to said transformer primary winding, a manually operable primary switch between said primary tap cable and said primary underground cable, support means affixed to said sidewall for supporting said switch within the interior of said cylindrical sidewall above ground level, and fault indicating means inductively linked with one of said primary cables for visually indicating when a fault current of predetermined magnitude flows in said one cable, said fault indicating means being visible and adapted to be reset through said access opening.

6. In an underground electrical distribution system for residential service, in combination, an open-ended vault of bituminized fiber disposed in the ground with its axis vertical and its upper end at ground level and having conductor passage means extending therethrough, an open-ended cylindrical sidewall above ground level affixed to said vault adjacent the upper end thereof and having a plurality of louvers therein, a cover removably secured to and normally closing the upper end of said sidewall, a distribution transformer disposed within said vault below ground level and having a sealed casing enclosing inductively linked primary and secondary windings, a secondary underground cable extending through said conductor passage means in said vault and being electrically connected to said secondary winding, a sectionalizing switch having a cup-shaped porcelain housing, a transparent cover, first, second and third stationary contacts supported approximately ninety degrees apart in an arc within said housing, a semi-circular metallic movable contact rotatable about the center of said arc into engagement with adjacent pairs of said stationary contacts and also being adapted to electrically interconnect all three stationary contacts, and a manually operable insulating shaft extending through said transparent switch cover and being operatively connected to said movable contact; each of said stationary contacts including a pair of opposed fingers adapted to engage opposite sides of said movable contact, spring means for resiliently urging said fingers into high pressure engagement with said movable contact, and eyebolt connector means having a threaded shank extending through said porcelain housing and a hand knob of insulating material engaging said shank exterior of said housing for fastening a cable conductor, support means affixed to said sidewall for mounting said switch above ground level with said sidewall, a primary tap cable within said vault connected at one end to said primary winding and at the opposite end to the first of said stationary contacts, and incoming and outgoing underground primary cables extending through said conductor passage means into the interior of said vault and being connected to the second and third of said stationary contacts.

7. In an underground electrical distribution system for residential service, in combination, an electrical apparatus housing including an open-ended tubular vault of bituminized fiber positioned in a cylindrical hole in the earth with its axis vertical and its upper edge approximately at ground level and having a plurality of radially extending conductor passages therethrough, cover means removably closing the open upper end of said housing, a distribution transformer disposed within said vault below ground level and having a sealed casing provided with a plurality of cable entrance apertures and enclosing inductively related primary and secondary windings, a primary tap cable within said vault extending through one of said cable entrance apertures and being connected to said primary winding, an underground secondary cable extending through one of said conductor passages in said vault and through one of said cable entrance apertures in said casing and being connected to said secondary winding, means for sealing said cable entrance apertures in said casing, incoming and outgoing underground primary cables each of which extends through one of said conductor passages in said vault into the interior thereof, a sectionalizing switch including a cup-shaped porcelain casing enclosing first, second and third stationary contacts connected to said incoming, outgoing and tap primary cables respectively, a movable metallic contact adapted to electrically bridge any two of said stationary contacts and also to electrically interconnect all three of said stationary contacts, a transparent cover for said porcelain casing permitting visual determination of the position of said switch when said housing cover means is removed, and support means for mounting said porcelain switch casing within said housing.

8. In an underground electrical distribution system for residential service, in combination, a tubular open-ended vault of bituminized fiber disposed in the earth with its axis vertical and its upper end at ground level and having conductor passage means extending therethrough, an open-ended metallic cylindrical sidewall section above ground level affixed to said vault adjacent the upper end thereof and having a plurality of louvers therethrough and an opening therein permitting access to the interior of said sidewall section, a cover removably secured to and closing the open upper end of said sidewall section, an inspection door normally closing said access opening, means for padlocking said cover and said door closed, a distribution transformer disposed within said vault below ground level and having a sealed casing provided with a plurality of cable entrance apertures and enclosing primary and secondary transformer windings and having a peripherally continuous sidewall and a bottom wall secured to said sidewall above the lower end thereof, whereby the cooling characteristics of said transformer are not affected by debris within said vault up to the level of said bottom wall, a sectionalizing switch having three spaced apart stationary contacts and a movable contact adapted to be actuated between switching positions wherein it electrically bridges adjacent pairs of said stationary contacts and also to a position wherein it electrically bridges all three of said stationary contacts, a primary tab cable connected at one end to the first of said stationary contacts and extending through one of said cable entrance apertures in said casing and being connected at the other end to said primary winding within said casing, incoming and outgoing underground primary cables extending through said conductor passage means in said vault and being electrically connected to said second and third stationary switch contacts respectively, means affixed to said sidewall section for mounting said sectionalizing switch within said sidewall section above ground level, means for grounding said sidewall section, a secondary underground cable extending through one of said conductor passage means into the interior of said vault and through one of said cable entrance apertures in said casing and being electrically connected to said transformer secondary winding, means for hermetically sealing said cable entrance apertures in said transformer casing, and fault indicating means adapted to visually indicate when a current of predetermined magnitude flows in one of said primary cables, said fault indicating means being visible and adapted to be reset through said access opening.

9. In an underground electrical distribution system for residential service, in combination, a tubular open-ended vault or bituminized fiber disposed in the earth with its axis vertical and its upper end at ground level and having conductor passage means extending therethrough, an open-ended metallic cylindrical sidewall section above ground level affixed to said vault adjacent the upper end thereof and having a plurality of louvers therein, a cover removably secured to and closing the open upper end of said sidewall section, a distribution transformer disposed within said vault below ground level and having a sealed casing enclosing a primary and a secondary winding and being provided with a peripherally continuous sidewall and a bottom wall secured to said sidewall above the lower end thereof, whereby the cooling characteristics of said transformer are not affected by debris within said vault up to the level of said bottom wall, a primary tap cable within said vault electrically connected to said primary winding, incoming and outgoing underground primary cables extending through said conductor passage means in said vault into the interior thereof, a sectionalizing switch having a cup-shaped porcelain housing enclosing first, second and third stationary contacts supported in an arc within said porcelain housing and being connected respectively to said tap, incoming and outgoing primary cables, a movable metallic contact manually operable between switch positions wherein it bridges between adjacent pairs of said stationary contacts and also to a position wherein it electrically bridges all three of said stationary contacts, a transparent insulating cover for said porcelain housing permitting visual determination of switch position when said vault cover is removed, an operating shaft of insulating material operatively connected to said movable contact and extending through said transparent switch cover, means affixed to said sidewall section for mounting said switch therein above ground level, means for grounding said sidewall section, and a secondary underground cable extending through said conductor passage means into the interior of said vault and being electrically connected to said transformer secondary winding.

References Cited by the Examiner

UNITED STATES PATENTS 2,024,742 12/1935 Parsons ------------ 174—37 X

ORIS L. RADER, *Primary Examiner.*

T. B. JOIKE, *Assistant Examiner.*